3,157,429
VEHICLE BODY COMPARTMENT CLOSURE
OPERATING MECHANISM
William J. Harms, Dearborn, and Alfred E. Leininger, Ypsilanti, Mich., assignors to Ford Motor Company, Dearborn, Mich., a corporation of Delaware
Original application Mar. 2, 1960, Ser. No. 12,436, now Patent No. 3,059,962. Divided and this application Apr. 16, 1962, Ser. No. 187,782
7 Claims. (Cl. 296—76)

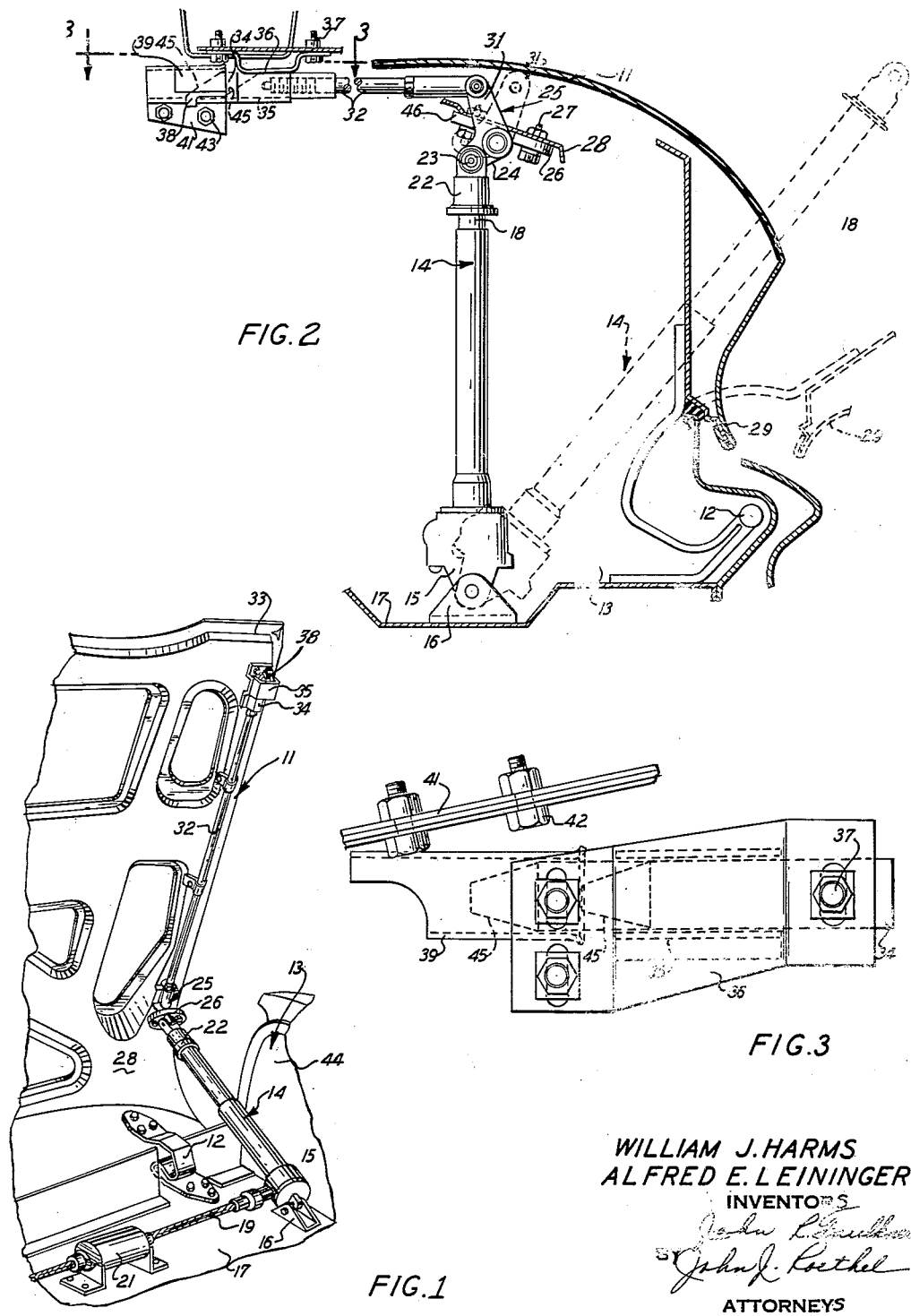

This invention relates generally to motor vehicle bodies in which certain compartment closures, such as luggage compartment lids, are preferably raised or lowered and unlatched or latched by a power operated mechanism.

This application is a division of copending application Serial No. 12,436, filed March 2, 1960, now Patent No. 3,059,962, entitled "Vehicle Body With Retractable Rigid Top."

In many conventional convertible vehicles now being produced, the foldable top structure, whether it be fabricated of fabric or rigid material, is movable by a power operated folding and transporting mechanism from an extended or passenger compartment protecting position to a folded or stored position within the luggage compartment to the rear of the passenger compartment. With a power operated top structure, it is to be expected that the storage or luggage compartment lid would also be power operated so that it could be sequentially unlatched and raised to receive the top structure and then lowered and latched when the top structure is nested within the luggage compartment. By the provision of such power operated mechanism, whether it be for raising and lowering the top and opening or closing the deck lid, the vehicle operator is able to convert the vehicle from an open to a closed car or vice versa without leaving his seat.

The present invention is particularly directed to the provision of an improved and positive acting mechanism operative to sequentially unlatch, raise, lower and latch the compartment closure structure. The improved structure comprises a power operated means having extensible closure lifting and lowering means supported on the vehicle body structure. A lever means is pivotally mounted on bracket means carried on the compartment closure, the lever means being pivotally coupled to the extensible means. The lever means is coupled to a latch means carried by the compartment closure, the latch means in latched position being engageable with a keeper device mounted on the body structure. When the compartment closure is in lowered position and the power operated means is operated to raise the same, the first movement of the extensible means in closure raising direction actuates the lever means to unlatch the latch means from the keeper device. After the unlatching action is completed, a part of the lever means engages an abutment means on the compartment closure structure whereby lifting force of the extensible means is transmitted directly to the compartment closure structure to open the latter by swinging the same about a hinge structure supporting the closure structure on the body. Upon operation of the power operated means to lower the compartment closure, the lever means remain in contact with the abutment means until the compartment closure is fully lowered. At this time further movement of the extensible means is transmitted through the lever means to the latch means urging the latter into latching engagement with the keeper device. This construction and arrangement provides a simple efficient mechanism always operable in proper sequence to unlatch, raise, lower and latch the compartment closure to the vehicle body.

Other objects and advantages of this invention will be made more apparent as this description proceeds, particularly when considered in connection with the accompanying drawing, wherein:

FIG. 1 is a fragmentary perspective view illustrating the top storage compartment closure or deck lid in raised position and more particularly showing the mechanism for raising and lowering the latter and the latch mechanism associated therewith;

FIG. 2 is an enlarged side elevational view illustrating the compartment closure raising and lowering linkage and the compartment closure latching mechanism associated therewith; and FIG. 3 is a sectional view taken substantially through the line 3—3 of FIG. 2 looking in the direction of the arrows.

Referring now to the drawings, there is illustrated a preferred construction and arrangement of a power operated mechanism for raising and lowering a luggage compartment closure or rear deck lid 11, the mechanism having associated therewith a latch device for latching the deck lid in lowered or compartment closing position.

The closure or deck lid 11 is supported at its lower rear edge on simple strap hinges 12. It is adapted to be swung upwardly and rearwardly, or in a clockwise direction as viewed in FIG. 2, to provide access to the luggage or storage compartment 13. The power operated mechanism for raising the compartment closure or deck lid 11 comprises a pair of jackscrew devices, each generally designated 14, located at each rear corner of the storage compartment 13, only one of which is visible in the drawing. The lower end 15 of the jackscrew device 14 is pivotally mounted on a suitable bracket 16 mounted on the floor 17 of the storage compartment 13. The lifting screw 18 of the jackscrew device 14 is driven through a conventional worm and gear drive (not shown), the worm being rotated by a flexible cable 19 coupled to a centrally positioned electric motor 21. It will be understood that the electric motor 21 is provided with a double ended output shaft so that the single motor may drive flexible cables which lead to the jackscrew devices 14 located at each side of the storage or luggage compartment.

The upper end 22 of the lifting screw 18 is pivotally connected at 23 to a depending arm 24 of a bell crank lever generally designated 25. The bell crank lever 25 is pivotally mounted on a bracket 26 held by bolts 27 to the underside of a structural member 28 of the luggage compartment closure or rear deck lid outer shell 29. The bell crank lever 25 is provided with a generally upstanding arm 31. The arm 31 is pivotally connected to one end of a draft link 32 which extends beneath the upper skin structure 29 of the deck lid 11 toward the front edge 33 thereof. The forward end of the draft link 32 is coupled to a slidable latch bolt 34 which is slidably guided in a sleeve 35 welded or otherwise secured to the underside of a channel member 36 secured by bolts 37 to the underside of the structural members reinforcing the outer shell 29 of the deck lid 11. As best seen in FIG. 2, the latch bolt is provided with a depending lug 38 which limits the retraction of the latch bolt relative to the sleeve 35.

The latch bolt 34 is adapted to engage a keeper 39 in the form of a sleeve provided with a depending flange portion 41. The flange portion is adapted to receive bolts 43 for holding the keeper to the side wall of the vehicle body rear quarter panels 44. The latch bolt 34 is provided with a suitably tapered nose portion 45 to provide easy entrance into the keeper sleeve portion 39 thereby compensating for any misalignment of the deck lid structure 11 with the quarter panel 44 and the quarter panel (not shown) on the other side of the vehicle body.

The operation of the deck lid raising and lowering mechanism and its associated latching mechanism is relatively simple. With the deck lid structure 11 in lowered position, the lifting screw 18 is telescoped within the outer housing of the jackscrew device 14. Upon rotation of the electric motor 21 in the proper direction, the lifting screw 18 of the jackscrew device 14 moves away from the vehicle storage compartment floor 17. As the screw 18 moves away or upwardly, it swings the bell crank lever 25 in a clockwise direction as viewed in FIG. 2. It will be noted that there is a certain degree of clearance between the end of the arm 24 of the bell crank lever 25 and the opposed surface 46 of the bracket 26, providing, in effect, a lost motion connection. This lost motion connection has the purpose of permitting the bell crank lever 25 to swing sufficiently far in a clockwise direction to cause retraction of the latch bolt 34 from the keeper device 39 before any attempted lifting force is applied to the deck lid structure 11. With the latch bolt 34 retracted from the keeper 39 and with the bell crank arm 24 engaging the surface 46 of the bracket 26, the lifting force of the lifting screw 18 will then be applied directly to the underside of the rear deck lid. The latter will then be swung upwardly about its pivotal mounting or hinges 12 to the substantially upright position shown in FIG. 1. When this upward swinging movement is completed, a suitable limit switch (not shown) may be actuated to permit operation of a top retracting mechanism (not shown) when the top is to be retracted or to permit operation of the mechanism when the top is to be removed from the storage compartment and extended over the passenger compartment.

When the deck lid structure is to be lowered or retracted, the electric motor 21 will be energized to rotate the drive cable 19 in a reverse direction and through the power train causing the lifting screw 18 to be retracted within the jackscrew device 14. Since the weight of the deck lid structure 11 is in a downward direction, the bracket surface 46 will remain in abutting relation to the bell crank arm 24 until the deck lid is completely lowered and its forward lip portion 33 and side portions are engaged with the edges of the quarter panels. When the deck lid structure is down as far as it can go, the lifting screw 18 will continue to pull down on the bell crank lever arm 24 causing the bell crank 25 to be swung in a counterclockwise direction, as viewed in FIG. 2, thereby pushing the draft link 32 to the left causing the bolt to be extended into engagement with the keeper 39. As was stated above, the bolt is provided with a downwardly extending lug 38 which engages the edge portion of the guide sleeve 35 when the deck lid structure is being raised. This prevents the bolt from being retracted too far and also assists in the lockup of the bell crank lever 25 as its arm 24 engages the surface 46 of the bracket 26 so that the force of the lifting screw 18 will be applied directly to the deck lid structure 11.

As noted above, there are preferably two jackscrew devices and associated latching mechanisms, one system for each side of the luggage compartment. Also, it is believed readily apparent that hydraulic power cylinders would be equally applicable to the system in place of the jackscrew devices 14.

It will be understood that the invention is not to be limited to the exact construction shown and described, but that various changes and modifications may be made without departing from the spirit and scope of the invention, as defined in the appended claims.

We claim:
1. In a motor vehicle body;
a rear deck lid pivotally connected to said body and providing a storage space therebeneath;
power operated means for raising and lowering said deck lid,
said power operated means comprising extensible means mounted on said vehicle body;
bracket means mounted on said deck lid,
said bracket means having an abutment portion thereon;
lever means pivotally mounted on said bracket means and operatively pivotally coupled to said extensible means for movement by the latter;
latch means carried by said deck lid;
and link means coupling said latch means to said lever means;
said lever means in deck lid lowered position being movable by said extensible means to a degree sufficient to unlatch said latch means and having a part thereof engageable with said abutment means to transmit lifting force from said extensible means directly to said deck lid to open the latter.

2. In a motor vehicle body;
a rear deck lid pivotally connected to said body adjacent its rearward end and providing a storage space therebeneath;
power operated means for raising and lowering said deck lid,
said power operated means comprising extensible means supported on said vehicle body;
bracket means mounted on said deck lid;
lever means pivotally mounted on said bracket means and coupled to said extensible means for movement by the latter;
a retractable latch means carried by said deck lid;
link means coupling said latch means to said lever means;
and a keeper device carried by said body;
said extensible means in deck lid lowered position being first operative to move said lever means sufficiently to retract said latch means from said keeper device and then sequentially being operative to transmit lifting force directly to said deck lid to open the latter,
said latch means remaining retracted until said deck lid is returned to a closed position upon retraction of said extensible means,
said extensible means being retractable beyond said deck lid closed position to swing said lever means in a direction to extend said latch means into engagement with said keeper device.

3. In a motor vehicle body have a closure structure swingably mounted thereon,
extensible means supported on said body for raising and lowering said closure structure,
lever means mounted on said closure structure and coupled to said extensible means for movement by the latter upon extension and retraction thereof,
latch means carried by said closure structure,
link means connecting said latch means to said lever means,
said extensible means in closure latched and lowered position being operative upon actuation in extension direction to move said lever means in a direction to cause unlatching of said latch means,
and means inhibiting further movement of said lever means after completion of the unlatching movement of said latch means,
said inhibiting means causing further actuation of said extensible means in extension direction to be exerted directly on said closure to raise the same.

4. In a motor vehicle body,
a closure structure swingably mounted thereon,
extensible means pivotally supported on said body for raising and lowering said closure structure,
lever means pivotally mounted on said closure structure and pivotally coupled to said extensible means,
said lever means being movable on said closure structure during predetermined phases of the extension and retraction of said extensible means,
slidable latch means carried by said closure structure,
link means connecting said latch means to said lever means for movement thereby in latching and unlatching directions,
said extensible means in closure lowered and latched position being effective upon extension to move said lever means in a direction to cause unlatching of said latch means.

and stop means blocking further movement of said lever means after completion of the unlatching movement of said latch means, said stop means causing further extension of said extensible means to raise said closure.

5. In a motor vehicle body, a closure structure swingably mounted thereon, power operated extensible means supported on said body for raising and lowering said closure structure, lever means mounted on said closure structure and coupled to said extensible means for movement thereby, latch means carried by said closure structure, link means connecting said latch means to said lever means for movement thereby in latching and unlatching directions, and a keeper device mounted on said vehicle body and engageable by said latch means, said extensible means in closure lowered and latched position being effective during initial extension movement thereof to move said lever means in a direction to cause unlatching of said latch means from said keeper device, and stop means preventing further movement of said lever means after completion of the unlatching movement of said latch means, said extensible means then applying its extension force directly to said closure structure to raise the latter.

6. In a motor vehicle body, a closure structure swingably mounted thereon, extensible means having one end pivotally anchored to said body and the other end movable relative to the anchored end, lever means pivotally mounted on said closure structure and coupled to the movable end of said extensible means, latch means carried by said closure structure, and link means extending between said latch means and lever means, said lever means in closure lowered position being movable by said extensible means in a direction to unlatch said latch means, an abutment means on said closure structure, said lever means after completion of the unlatching movement abutting said abutment means and causing said extensible means to apply lifting force directly to said closure structure to raise the latter.

7. In a motor vehicle body, a closure structure swingably mounted thereon, extensible means having one end pivotally anchored to said body and the other end movable relative to the anchored end, lever means pivotally mounted on said closure structure and coupled to the movable end of said extensible means, latch means carried by said closure structure, and link means extending between said latch means and lever means, said lever means in closure lowered position being movable by said extensible means in a direction to unlatch said latch means, an abutment means on said closure structure, said lever means after completion of the unlatching movement abutting said abutment means and causing said extensible means to apply lifting force directly to said closure structure to raise the latter, said lever means remaining in engagement with said abutment means until the closure structure is returned to a closed position by retraction of said extensible means.

said extensible means being retractable until said latch means is in a relatched condition.

References Cited in the file of this patent

UNITED STATES PATENTS

| | | |
|---|---|---|
| 2,352,929 | Worgess | July 4, 1944 |
| 2,594,643 | Gustisha | Apr. 29, 1952 |
| 2,869,923 | Mulichak | Jan. 20, 1959 |